Feb. 21, 1928.
O. W. SAMMET
1,659,786
VENTILATOR
Filed Aug. 6 1927
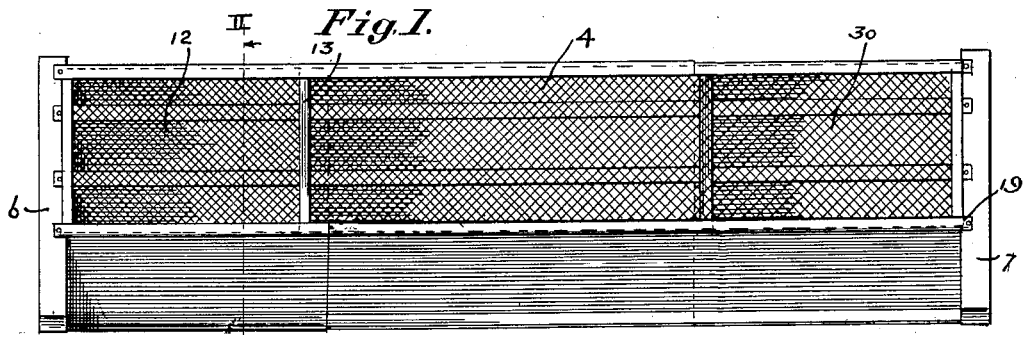
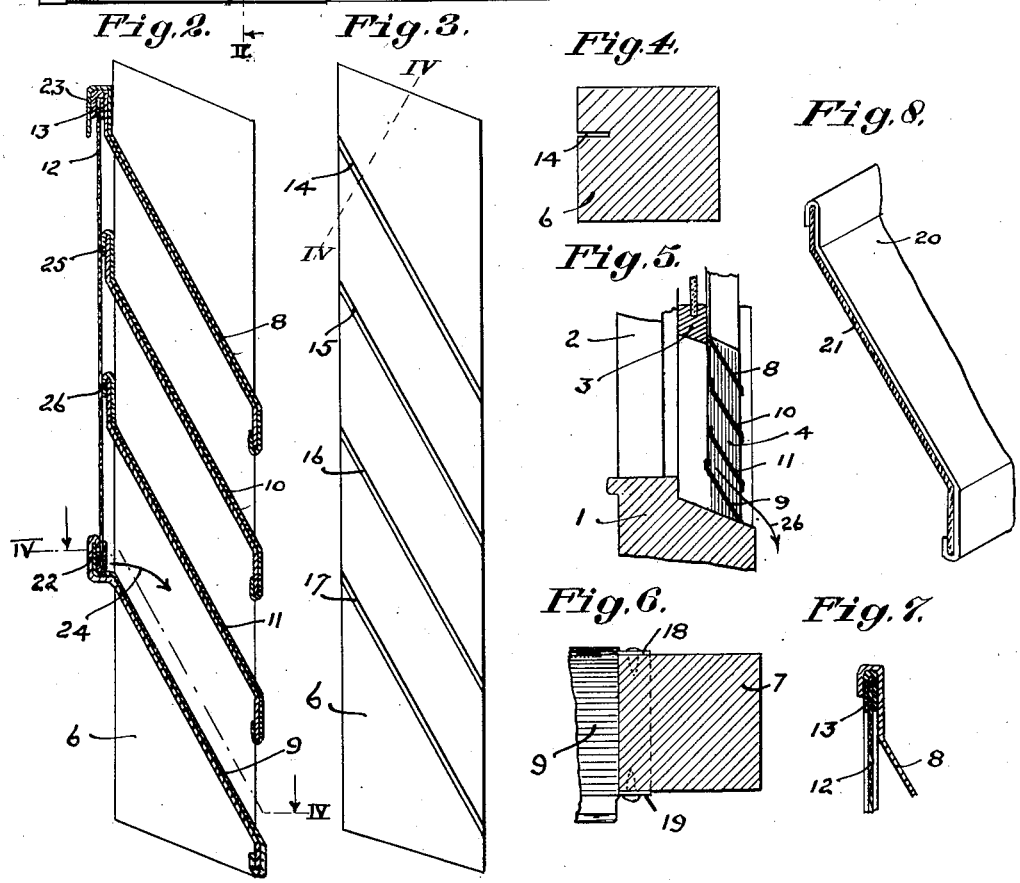
INVENTOR.
Otto W Sammet
BY George J. Henry
ATTORNEYS.

Patented Feb. 21, 1928.

1,659,786

UNITED STATES PATENT OFFICE.

OTTO W. SAMMET, OF SAN FRANCISCO, CALIFORNIA.

VENTILATOR.

Application filed August 6, 1927. Serial No. 211,166.

My invention has for its object means adapted to fit within a window frame and between the sash and the sill, whereby ventilation may be attained at all times regardless of weather conditions, while preventing the entrance of dust and insects, and while rain is prevented entrance and wind or heavy drafts are broken up.

Another object is in a device of the character described, a mounting for the screen portion of my ventilator whereby the lower support for the screen is left open on the weather side to facilitate drainage and prevent the collection of dirt and dust therein.

Another object is a device of the character described wherein the screen means is guided and held through a combination of screen and intermediate shutter elements.

Other objects will appear from the drawing and specifications which follow.

These objects I attain by providing a plurality of shutter members each comprising a plurality of telescoping elements, each of said elements of each shutter is fixed on one of its ends to an end member and the bottom shutter is provided with a flange or half trackway while the intermediate shutters are provided with edges in alignment between said half trackway and tracking means in the upper shutter.

The elements of each shutter are rolled or formed to embrace each other and facilitate the telescopic movement.

By referring to the accompanying drawing my invention will be made clear.

Fig. 1 is a front view of a preferred form of my ventilator.

Fig. 2 is an enlarged cross section of Fig. 1 on the line II—II thereof.

Fig. 3 is an end view of one of the column members between which the shutters and screen are assembled.

Fig. 4 is a cross section of Fig. 3 on the line IV—IV thereof.

Fig. 5 is a reduced fragmentary section through a conventional window frame and sash with my ventilator positioned therein.

Fig. 6 is a fragmentary section through one of the column or end members on the line VI—VI of Fig. 2 to show the manner of assembly and fixing the shutters to the column members.

Fig. 7 is a fragmentary section through one of the upper or top shutter elements with a portion of the screen shown slidably engaged therein.

Fig. 8 is a fragmentary perspective section through one of the intermediate shutters showing the manner in which the two elements of the shutter are interlocked by forming or rolling the plates together, with one of the elements shown in section.

Throughout the figures similar numerals refer to identical parts.

In Fig. 5 a conventional window sill is shown at 1, a window frame at 2, a fragment of a sash at 3, with my ventilator generally shown by the numeral 4 positioned therein.

At 6, 7 respectively are end columns between which the shutter members and screen are assembled.

An upper shutter member is shown at 8, a lower shutter at 9 and a plurality of intermediate shutters are shown at 10, 11 respectively.

A wire mesh screen in two parts and preferably fixed within the two part telescoping frame 13 covers the inner or room side of the opening between the shutters 8 and 9 and the column members 7 and 6 as best shown in the front view of Fig. 1, at 12 and 30 respectively.

The column members 6 and 7 are grooved on an angle at 14, 15, 16, 17 respectively and into these grooves the end portions of the several shutters are entered, the projecting and overlapping edges being turned down against the column and affixed thereto as with conventional screws or tacks as 18, 19.

Each of the shutter members comprise two or more elements adapted to telescope within each other as best shown in Fig. 8, wherein one element is shown at 20 rolled over on each of its ends and thus slidably embracing the second element 21.

A group of such elements assembled between the columns 6 and 7 may be thus pulled in or out to adjust the length to suit the width of the window opening.

Likewise the screen made up of sections 12 and 30 is of two parts slidable with respect to each other so that it may be pulled out to completely cover any of the varying widths between the columns 6 and 7 or closed together to leave a clear opening over a part of the shutter fronts.

Particular attention is directed to the manner in which this screen is mounted and retained in position, between the top and bottom shutters and wherein the lower shutter member 9 extends inward and is turned up forming one half of a trackway or a flange 22 against which the screen 12 and frame 13 may slide, the upper edge of the screen being embraced in a conventional channel at 23 formed on the upper shutter member 8.

The upstanding flange 22 formed on the member 9 allows free drainage either of moisture or of dirt and dust at all times, in the direction of the arrow 24, and the screen is retained in position against the flange 22 by either or both of the edges 25, 26 of the members 10, 11 respectively, so that the screen is slidably retained in any of its adjusted positions at all times through the combined action of flange 22, track 23 and edge 26 of member 11.

In this way it will be seen that the running joint of the screen is retained dry and operative at all times, its lower contacting edges being self cleaning in the direction of the arrow 24.

While the shutter members may be constructed of any suitable material I have found sheet galvanized iron or copper to be best suited while the columns 6 and 7 may be with advantage made of wood, in which case the turned over portion of the shutter against the face of the wood provides ends convenient for fastening or securing the shutters as at 18, 19, to the columns in the assembled relation shown in Fig. 1.

By referring specifically to Fig. 2 it will be seen that the side of my ventilator which is exposed to the weather opposite to the screen 12 sheds water downward and that the rolled over edges of the several elements of the shutter members is in an inward direction away from the weather so that moisture and dirt are prevented from collecting therein.

That the screen 12 is by the member edge 26 held in slidable engagement against the upstanding flange 22 of the element 9 and that as each of the shutters is of a plurality of parts telescoped together, the columns 6 and 7 may be grasped and pulled apart or pushed together to adjust the ventilator to suit varying window widths, and that the screen consisting of two parts 12—30 respectively, may at any time with the screen in position in the window of Fig. 5, be slid back so as to expose substantially half of the ventilator openings clear of the screen, or may be slid in the opposite direction to cover the entire ventilator surface with the screen as shown in Fig. 1.

I claim:

1. In a ventilator for windows a plurality of shutter members spaced apart with one edge of each member in the same plane, an angle on the lower of said edges and having an upstanding leg, an inverted trackway along the topmost of said edges, a screen between said track-way and said angle and having a bearing against the intermediate of said edges.

2. In a ventilator for windows a plurality of shutter members spaced apart with one edge of each member in the same plane, an angle on the lower of said edges and having an upstanding leg, an inverted track-way along the topmost of said edges, a screen between said track-way and said angle and having a bearing against the intermediate of said edges, each of said members and said screen in portions adapted to telescope together.

3. In a ventilator for windows, a plurality of intermediate shutter members, a top and a bottom shutter member, end columns between which all of said members are fixed in spaced relation, the upper edge of said top member having an inverted groove and the upper edge of said bottom member having an angle with a horizontal and also a vertical leg, a screen adapted to slide between said groove and said horizontal leg and contacting on the inner side with said intermediate members and retained in place by said vertical leg.

4. In a ventilator for windows, a plurality of intermediate shutter members, a top and a bottom shutter member, end columns between which all of said members are fixed in spaced relation, the upper edge of said top member having an inverted groove and the upper edge of said bottom member having an angle with a horizontal and also a vertical leg, a screen adapted to slide between said groove and said horizontal leg and contacting on the inner side with said intermediate members and retained in place by said vertical leg, each of said members and said screen in portions adapted to telescope together.

OTTO W. SAMMET.